INVENTORS
WILLIAM MARVIN TUDDENHAM
DAVID L. ADAMSON
BY
ATTORNEYS

United States Patent Office 3,682,798
Patented Aug. 8, 1972

3,682,798
METHOD AND APPARATUS FOR ELECTROREFIN-ING PARTICULATE METALLIC MATERIALS
William Marvin Tuddenham and David L. Adamson, Salt Lake City, Utah, assignors to Kennecott Copper Corporation, New York, N.Y.
Filed Feb. 20, 1970, Ser. No. 13,088
Int. Cl. C22d 1/16; C23b 5/74
U.S. Cl. 204—108
8 Claims

ABSTRACT OF THE DISCLOSURE

At least one mass of closely associated, discrete particles of a metallic material to be electrolytically refined, such as shotted anode copper or copper precipitates derived by cementation from solution on metallic iron, is confined with an electrolytic cell by solution-permeable walls and is provided with electrical connection to serve as an anode for the cell. An electrolyte is continuously circulated into, through and out of the cell, which is provided with at least one cathode of conventional type. The electrolyte is forcibly injected within the body of the particulate mass at a flow velocity too low to fluidize the particles but high enough to purge such mass of metal cations and to carry them through the interstices of the mass and out through the permeable confining walls, so as to prevent concentration polarization of the anode without unduly increasing power requirements.

BACKGROUND OF THE INVENTION

Field

The invention is in the field of electrolytic refining, especially of particulate material serving as an anode in an electrolytic cell.

State of the art

Massed particulate metallic material has heretofore been utilized as an anode in electrolytic refining, but has always either been subject to early concentration polarization or has required excessively high voltage to carry out the process. At one time it was thought that a so-called "fluidized" anode bed of particulate material was the answer to the problem of concentration polarization, wherein there is a build-up of metallic ions in the immediate vicinity of the individual particles and chemical combination of those ions with non-metallic ions of the solution to form crystals which blind the metallic surfaces of the anode. Although some degree of success was achieved with certain anode materials, others, such as copper precipitates, required the use of such high voltages as to make fluidization impractical.

BRIEF SUMMARY OF THE INVENTION

In accordance with this invention, concentration polarization of the particulate anode is avoided and low voltage operation achieved by continuously injecting electrolyte directly into at least one high density, but permeable, particulate mass confined in an electrolytic cell as an anode by electrolyte-permeable walls. Injection of the electrolyte is at a velocity low enough not to fluidize the individual particles of the mass. It was found that a low-velocity flow removes metallic ions from the mass and prevents concentration polarization of the anode, without disrupting close particle-to particle association and thereby increasing electrical resistance. Flow of the electrolyte through the cell contitnues in this manner, with the metal ions purged from the anode mass or masses being carried into the vicinity of the cathode or cathodes of the cell prior to discharge of the electrolyte from the cell for recirculation.

THE DRAWINGS

Figure 1:
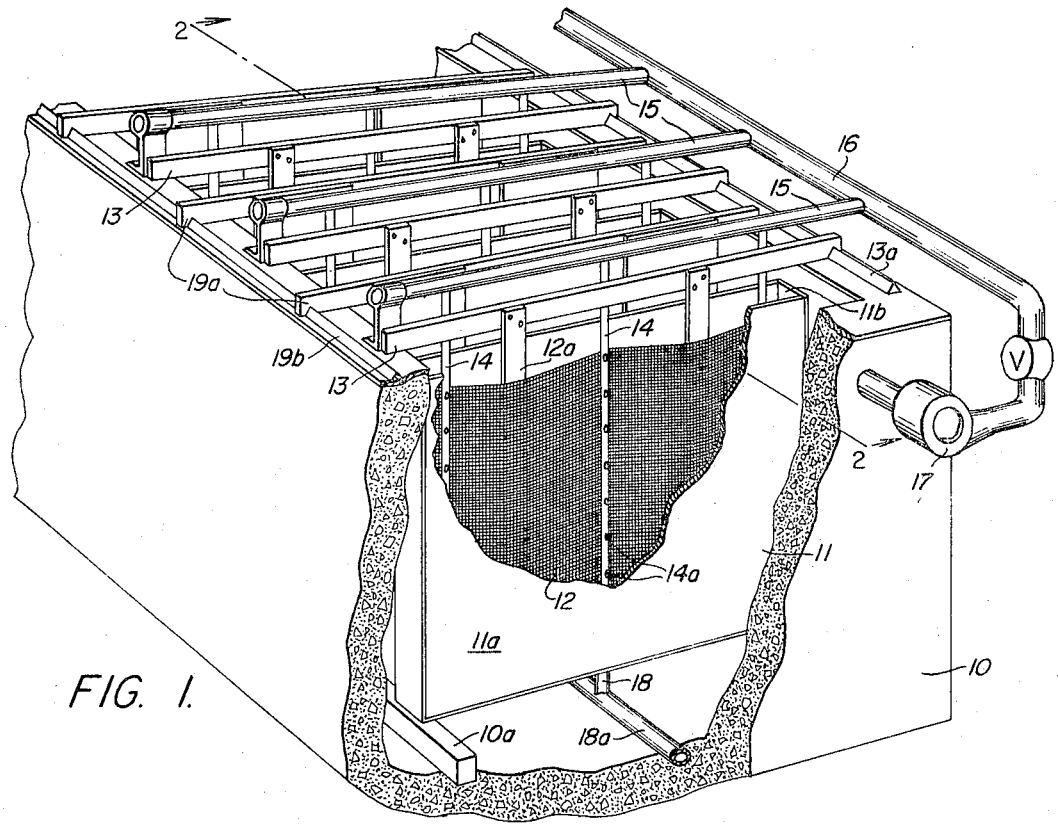
Figure 2:
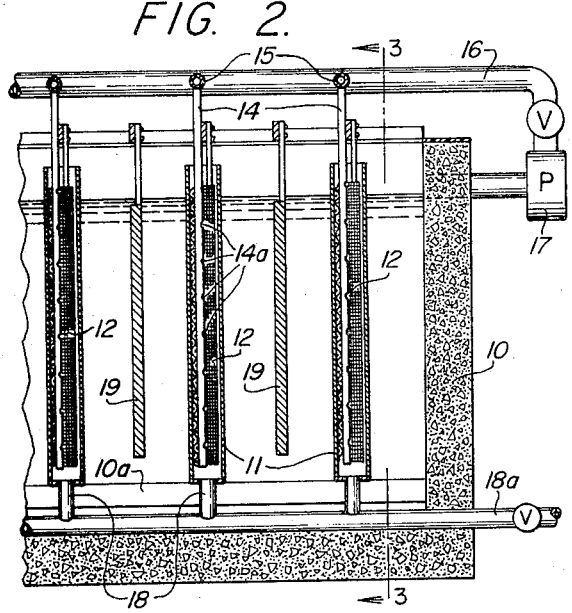
Figure 3:
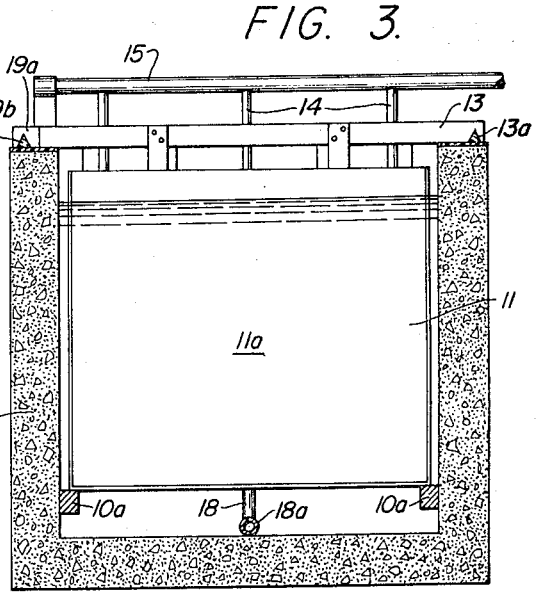

An embodiment of apparatus representing the best mode presently contemplated for carrying out the process of the invention is illustrated in the accompanying drawings, in which:

FIG. 1 is a fragmentary isometric view of an electrolytic cell of the invention incorporating several anodes and cathodes alternately arranged along the length of the cell tank, a portion of whose walls are broken away to expose the interior;

FIG. 2, a fragmentary longitudinal, vertical section taken along the line 2—2 of FIG. 1; and FIG. 3, a transverse vertical section taken on the line 3—3 of FIG. 2.

DETAILED DESCRIPTION OF THE ILLUSTRATED EMBODIMENT

In the illustrated form of apparatus of the invention, an elongate concrete tank 10 of conventional construction is adapted to receive electrolyte and maintain a quantity thereof as a bath for electrolytic purposes in the electrowinning of metal values from particulate metallic materials, such as shotted anode copper or precipitate copper derived by the usual cementation of copper from solution on a metallic iron precipitant.

The particulate metallic material to be treated is confined in tank 10 by a series of electrolyte-permeable containers 11, each preferably configurated to resemble the usual rectangular slab anode and supported at its bottom by strips 10a extending longitudinally of tank 10 along the sides thereof. All or only a portion of the walls of each container 11 are of permeable material, such as titanium screen or a porous plastic frit. As illustrated, both of the broad walls 11a of each container 11 are permeable and the top 11b is open for receiving an original quantity and replenishment amounts of the particulate metallic material to be treated.

Within each container 11 is some suitable means for establishing an electrical connection between a source of power and the particulate metallic material serving as the anode. As illustrated, this advantageously takes the form of a rectangular grid 12 of titanium or some other electrically conductive but inert material supported by an electrically conductive hanger 13 making contact with an electrical bus bar 13a. Grid 12 is corrugated vertically to provide a series of valleys 12a extending from side to side laterally of the grid and alternating from one broad face of such grid to the other for accommodating a series of electrolyte-distribution tubes 14 that depend from a manifold tube 15. To supply the several anode containers 11 with electrolyte, a corresponding series of manifold tubes 15 extend across tank 10 from a main manifold tube 16, which is connected with the pressure outlet side of an electrolyte-circulating pump 17.

Each anode container 11 is preferably provided at its bottom with a discharge pipe 18 leading into a discharge line valved exteriorly of the tank to permit periodic flushing of accumulated slimes from the container.

Interposed between the anode containers 11 are customary plate cathodes 19, FIG. 2, with hangers 19a making electrical contact with a bus bar 19b to complete the electrolytic cell.

The particulate metallic material introduced into each container 11 forms a dense and pervious mass that provides an anode body in which the individual particles are freely but closely associated. The electrolyte-distribution tubes 14 extend within and through such anode body and are provided with orifices 14a at intervals along their lengths and around their circumferences for the injection of electrolyte directly within the anode body, it being realized that such tubes are embedded within and surrounded by the particulate metallic material.

As previously indicated, the flow rate at which the electrolyte is injected is important, for it is the purpose of the present process to purge the anode body of metal cations without fluidization of the mass of discrete particles of metallic material. It is quite apparent that the flow rate can vary widely, depending upon the type of particles making up the anode body. Thus, shotted anode copper can withstand a relatively high flow velocity without being fluidized, while finer particles with considerably less mass cannot. Precipitate copper is dendritic in character and especially suffers from fluidization. Moreover, flow rate will vary with current density, particle size distribution, and electrolyte or anode levels in the cell. Thus, an increase in current density or in electrolyte or anode levels will require a correspondingly increased flow rate. Coarser precipitates will withstand higher flow rates than will finer. Flow rate, therefore, must be determined in particular instances by comparing results obtained from various flow rates tried.

It has been found that, for precipitate copper having Fisher numbers between 1.0 and 2.0 microns and normal operating conditions of 30 grams per liter copper and 20 amperes per square foot current density, an hourly space velocity of 0.4 was required to prevent concentration polarization of the anodes. Current efficiency varied from 90 to 95% and operating voltage from 0.5 to 1.0 volt. The maximum hourly spaced velocity that could be employed without excessive cell voltages was 5.0. Good cathodes have been produced at current densities up to 40 amperes per square foot. Porous plastic frit is used for the pervious walls of the anode container when finely divided metallic materials of this type are employed as the anode.

For relatively coarse metallic anode materials, such as shotted copper, it is preferable to use screen for the pervious walls of the anode container since cell resistance is lowered significantly by release from the cell of much of the insoluble matter carried by the flowing electrolyte. This can be effectively removed from the electrolyte by filtration before recirculating the electrolyte back into the cell.

Utilizing shotted anode copper or shotted precipitate copper (0.02 to 0.1 inch in diameter), the flow rate of electrolyte is much less critical than with the fine particle precipitate. Hourly space velocities of 2 to 10 were used successfully with no fluidization of the anode body. High quality cathodes were produced at current densities up to 40 amperes per square foot. Current efficiencies run from 95 to 98 percent at the cathodes and from 100 to 102 percent at the anodes. Cell voltages can be kept at from 0.2 to 0.45 volt, with copper at 30 grams per liter and sulfuric acid at 100 grams per liter depending upon the slime characteristics of the shot.

Comparative analyses of copper cathodes produced in accordance with the present process and in accordance with prior practice at a typical electrolytic refinery are shown by the following table:

|    | Cathode from— | | | Typical refinery cathode |
|---|---|---|---|---|
|    | Precipitates | Shotted precipitates | Shotted anode | |
| As | 2 | <2 | <2 | 1 |
| Bi | <.2 | .2 | .2 | .2 |
| Fe | 12 | 1 | 1 | 1 |
| Ni | <2 | <2 | <2 | 2 |
| Pb | 2.6 | 2 | 2 | 1 |
| Sb | <3 | <2 | <2 | 3 |
| Sn | 1 | 1 | <.8 | <1 |
| Te | <3 | <3 | <3 | 3 |
| S | 6 | 10 | 9 | 12 |

Whereas this invention is here illustrated and described with respect to a certain preferred form thereof, it is to be understood that many variations are possible without departing from the inventive concepts particularly pointed out in the claims.

We claim:
1. A process for electrorefining particulate metallic materials, comprising massing, closely together between electrolyte-permeable walls and in intimate contact with electrical conductive means, discrete particles of a metallic material as an anode in an electrolytic cell that is provided with a cathode therefor; directly injecting a continuous flow of electrolyte at a plurality of locations within and along the depth of the body of the particulate mass at a flow velocity sufficiently low to substantially prevent fluidization of the individual particles thereof; removing metal cations from the interior of said mass by passing said electrolyte from said plurality of locations interiorly of said mass and through the interstices of the mass and through said permeable walls to the exterior of said mass to prevent concentration polarization of the anode; and circulating the electrolyte into the vicinity of said cathode and then back to and through said mass continuously.

2. A process in accordance with claim 1, wherein the metallic material is shotted anode copper.

3. A process in accordance with claim 1, wherein the metallic material is a copper precipitate formed by cementation of copper from solution on metallic iron.

4. Apparatus for electrorefining particulate metallic materials, comprising a tank for electrolyte; at least one anode means including walls defining a container in the shape of an anode containing a mass of particulate metallic material, at least a portion of said walls being permeable to the electrolyte; electrical conductive means in association with said container so as to intimately contact said mass of particulate material for electrically activating said anode means; and means for injecting electrolyte directly within the interior of said mass of particulate material at a plurality of locations along the depth of said mass, and said tank being adapted to receive at least one cathode means in spaced relationship to said anode means.

5. Apparatus in accordance with claim 4, wherein the means for injecting electrolyte directly within the mass of particulate material includes flow distributing piping extending into and along the interior of the container both longitudinally and transversely thereof.

6. Apparatus in accordance with claim 4, wherein means are provided at the bottom of the anode container for periodically draining said container.

7. Apparatus in accordance with claim 4, wherein the electrical conductive means includes a grid of titanium metal embedded in the mass of particulate material.

8. Apparatus in accordance with claim 7, wherein the grid is corrugated vertically to provide a series of valleys extending laterally of the grid and alternating between the broad sides thereof, and the flow distributing piping includes vertical pipes extending along the respective valleys and having jet orifices at intervals along their lengths.

References Cited

UNITED STATES PATENTS

| 1,757,047 | 5/1930 | Hosenfeld et al. | 204—107 |
| 1,449,462 | 3/1923 | Van Arsdale | 204—108 |
| 1,239,443 | 9/1917 | Antisell | 204—263 |
| 782,145 | 2/1905 | La Fontaine | 204—108 |

FOREIGN PATENTS

| 1,221,023 | 7/1966 | Germany | 204—106 |

OTHER REFERENCES

Modern Electroplating, by Lowenheim, 1968, pp. 18–19.

JOHN H. MACK, Primary Examiner

R. L. ANDREWS, Assistant Examiner

U.S. Cl. X.R.

204—263, 285